United States Patent [19]

Tani

[11] Patent Number: 5,316,064
[45] Date of Patent: May 31, 1994

[54] PNEUMATIC RADIAL TIRE INCLUDING A WOUND AUXILIARY BELT LAYER

[75] Inventor: Katsutoshi Tani, Kodaira, Japan
[73] Assignee: Bridgestone Corporation, Tokyo, Japan
[21] Appl. No.: 710,986
[22] Filed: Jun. 6, 1991
[30] Foreign Application Priority Data
  Jun. 13, 1990 [JP] Japan .................. 2-152532
[51] Int. Cl.⁵ .................. B60C 9/18; B60C 9/20
[52] U.S. Cl. .................. 152/531; 152/533; 156/117
[58] Field of Search .................. 152/531, 526, 533; 156/117

[56] References Cited

U.S. PATENT DOCUMENTS

| 4,244,415 | 1/1981 | Peter et al. .................. 152/531 |
| 4,869,307 | 9/1989 | Bormann et al. .................. 152/533 |

FOREIGN PATENT DOCUMENTS

| 258822A3 | 3/1988 | European Pat. Off. . |
| 0305558 | 3/1989 | European Pat. Off. . |
| 0313362 | 4/1989 | European Pat. Off. . |
| 0333628 | 9/1989 | European Pat. Off. . |
| 0400859 | 12/1990 | European Pat. Off. . |
| 0414470 | 2/1991 | European Pat. Off. .................. 152/533 |
| 2398625 | 2/1979 | France . |
| 62-203803 | 9/1987 | Japan . |
| 1132405 | 5/1989 | Japan . |
| 2246804 | 10/1990 | Japan . |
| 85964 | 1/1986 | Luxembourg . |

OTHER PUBLICATIONS

*Mechanics of Pneumatic Tires,* ed. Samuel Clark: US Dept. of Transportation, Aug. 1981, pp. 219–220.

Primary Examiner—Michael W. Ball
Assistant Examiner—Adrienne C. Johnstone
Attorney, Agent, or Firm—Sughrue, Mion, Zinn, Macpeak & Seas

[57] ABSTRACT

A pneumatic radial tire comprises a radial carcass of at least one carcass ply, a belt and a tread successively arranged on the carcass outward from the crown portion in radial direction, in which the tread has a plurality of circumferential grooves extending circumferentially of the tire and a plurality of island portions defined by these circumferential grooves and both side ends of the tread. The belt is comprised of at least two main belt layers and an auxiliary belt layer of a specific structure formed by helically and continuously winding a ribbon-shaped ply in series.

6 Claims, 1 Drawing Sheet

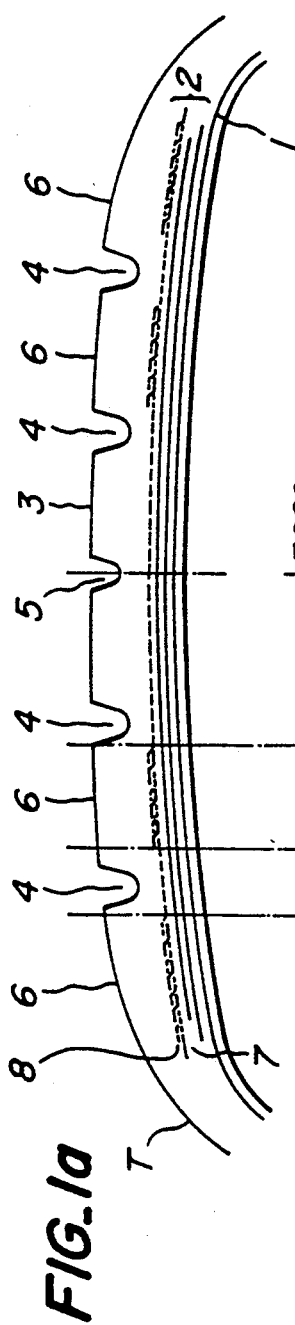
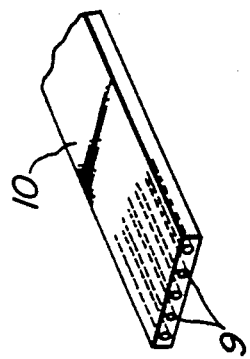
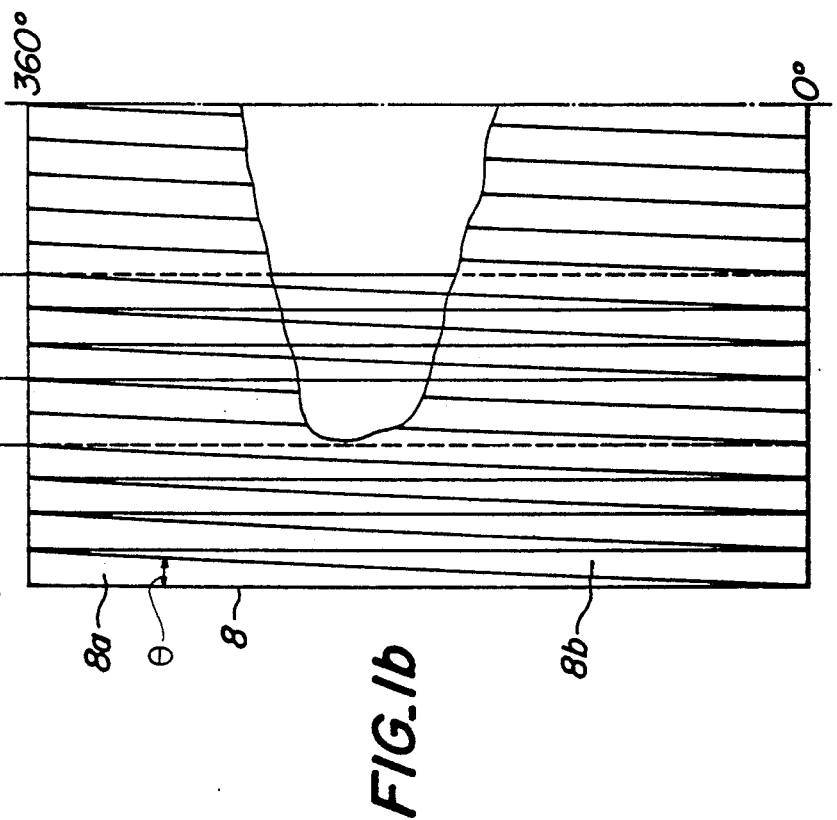

PNEUMATIC RADIAL TIRE INCLUDING A WOUND AUXILIARY BELT LAYER

BACKGROUND OF THE INVENTION

1. Field of the Invention

This invention relates to a pneumatic radial tire for passenger car use, and more particularly to an improvement of a belt in a low-profile radial tire suitable for high-speed running.

2. Related Art Statement

Recently, passenger cars can stably be run at super-high speeds of 200-300 km/h together with technical innovation, and consequently there are developed low-profile radial tires having sufficient running performances even at such a super-high speed and an aspect ratio of, for example, not more than 0.6.

When the tire is run at a super-high speed, there are particularly caused problems such as separation between tread and belt, chipping of tread rubber and the like. In order to solve these problems, it is important for the tire to be high in the durability or so-called high-speed durability.

As a tire structure considering such a high-speed durability, there is known a structure in which a belt is arranged outside a carcass. This belt is comprised of at least one main belt layer arranged outside the carcass and an auxiliary belt layer containing rubberized organic fiber cords wound outside and around the main belt layer under a certain tension.

Particularly, in order to ensure high-speed durability, the auxiliary belt layer has a two layer structure with a first layer wound around the main belt layer over a full width thereof and a second cord layer is wound on the first layer at regions corresponding to island portions of the tread. Also, the auxiliary belt layer has such a structure that a ribbon-shaped ply obtained by arranging plural cords side by side and coating them with rubber is helically wound around the main belt layer over a full width thereof to uniformly overlap the wound ribbon-shaped plies with each other at a given amount in widthwise direction.

In the above first defined structure of the auxiliary belt layer, the operation of winding the second layer on the first layer at regions corresponding to the island portions becomes complicated. Furthermore, since the cord end of the second layer is not restrained at each region, the hoop effect in the circumferential direction of the tire is low and also the problems such as tread separation and chunk-out are caused in the vicinity of the cord end. As a result the high-speed durability corresponding to the amount of the belt reinforcing material used. Moreover, the starting end and terminal end of the cord are existent in each of the regions, so that there is caused a stepwise difference in the rigidity of the carcass, which badly affects the uniformity of the tire.

In the structure of the auxiliary belt layer, the uniformly overlapped region of the ribbon-shaped ply is existent in the widthwise direction, so that it particularly tends to make the gauge of skid rubber located beneath the groove thin (not more than 1 mm). On the other hand, the skid rubber gauge is required to be 1-2 mm at minimum in order to make the thickness of tread rubber itself thin from viewpoint of high-speed durability in high-speed running tires and to ensure the depth of the circumferential groove from a viewpoint of drainage property. As described above, however, the skid rubber gauge is too thin in this structure of the auxiliary belt layer, so that there is a problem of creating cracks at the bottom of the circumferential groove during high-speed running.

SUMMARY OF THE INVENTION

It is, therefore, an object of the invention to provide a pneumatic radial tire of such a structure that the starting and terminal ends of the cord are less in the auxiliary belt layer to cause no difference in the rigidity of the carcass and make the uniformity excellent, the hoop effect of the auxiliary belt layer is high, the high-speed durability is excellent, and the winding of the auxiliary belt layer is easy.

The inventors have made various studies and found that the aforementioned problems are effectively solved by using a specific winding manner when the auxiliary belt layer is formed on the main belt layer arranged outside the carcass, and as a result the invention has been accomplished.

According to the invention, there is the provision of a pneumatic radial tire comprising a radial carcass composed of at least one carcass ply extending through a cylindrical crown portion between a pair of sidewall portions extended inward from both ends of the crown in a radial direction. A belt and a tread are successively arranged on the carcass outward from the crown portion in radial direction.

The tread has a plurality of grooves extending circumferentially of the tire and a plurality of island portions defined between these circumferential grooves and both side ends of the tread.

The belt is comprised of at least two main belt layers containing substantially inextensible cords arranged at a small inclination angle with respect to an equatorial plane of the tire, with cords of which layers being crossed with each other. An auxiliary belt layer is formed by winding a ribbon-shaped ply, which is obtained by arranging plural heat-shrinkable cords side by side and coating them with rubber, outside the main belt layer over its full width.

The auxiliary belt layer has a structure that regions substantially corresponding to the island portions adjacent to the tread end have a partially overlapped alternating arrangement of a parallel winding in which the heat-shrinkable cords in the ribbon-shaped ply extend on the same circumference in parallel to the equatorial plane and a slant winding in which the heat-shrinkable cords of the ribbon-shaped ply extend substantially at an inclination determined by $\tan^{-1}[($width of ribbon-shaped ply$)/($outer peripheral length of the main belt layers$)]$. A region substantially corresponding to at least one circumferential groove in the tread has a repetitive side by side arrangement only of the above slant windings; and the ribbon-shaped ply being continuous at least in each of the above regions.

BRIEF DESCRIPTION OF THE DRAWINGS

The invention will be described with reference to the accompanying drawings, wherein:

FIG. 1a is a schematically partial section view of the pneumatic radial tire according to the invention;

FIG. 1b is a partially schematic view illustrating a structure of an auxiliary belt layer in the tire of FIG. 1a; and FIG. 2 is a perspective view of a ribbon-shaped ply constituting the auxiliary belt layer.

DESCRIPTION OF THE PREFERRED EMBODIMENTS

In FIG. 1a is shown an embodiment of the structure of the pneumatic radial tire according to the invention, wherein numeral 1 is a carcass, numeral 2 a belt, numeral 3 a tread, numeral 4 circumferential grooves extending in parallel with an equatorial plane of the tire (circumference at a widthwise center of the tread) and separated from each other at a proper interval, numeral 5 an auxiliary circumferential groove arranged on the equator of the tire and having a depth shallower and a width narrower than those of the circumferential groove 4, and numeral 6 an island portion sandwiched between the circumferential grooves 4 or between the tread end T and the circumferential groove 4.

The carcass 1 is comprised of at least one carcass ply (usually 1-2 plies), each end portion of which is wound around each bead core (not shown) from inside of the tire toward outside to form a turnup portion. The carcass ply contains organic fiber cords such as polyester, rayon or nylon fiber cord arranged in a direction substantially perpendicular to the equatorial plane of the tire (radial direction).

The belt 2 is comprised of at least two main belt layers 7 containing rubberized substantially inextensible cords such as steel cords, aromatic polyamide fiber cords or the like arranged at an inclination angle of 15°-35° with respect to the equatorial plane the cords of these layers are crossed with each other. An auxiliary belt layer 8 is formed by winding a rubberized ply of heat-shrinkable cords (e.g. nylon cords) over a full width of the main belt layer 7 to substantially align these cords in parallel to the equatorial plane. The tread 3 is arranged on the belt 2.

The auxiliary belt layer 8 is constituted by winding a rubberized ribbon-shaped ply 10 (hereinafter referred to as a ribbon), which is formed by arranging plural heat-shrinkable cords 9, for example, 3-18 cords side by side as shown in FIG. 2, on the outer periphery of the main belt layer 7 over the full width thereof in series. As shown in FIG. 1b, a region of the auxiliary belt layer 8 corresponding to the island portion 6 at least adjacent to the tread end T, i.e. a region corresponding to each of two island portions 6 near to the tread end T, other than the central portion of the tread in the illustrated embodiment, has a two-layer structure being a partially overlapped alternating arrangement of a parallel winding 8a in which the heat-shrinkable cords 9 extend on the same circumference in parallel to the equatorial plane and a slant winding 8b in which the heat-shrinkable cords 9 extend substantially at an inclination determined by $\tan^{-1}[(\text{width of ribbon 10})/(\text{outer peripheral length of the main belt layers 7})]$ continuously from the parallel winding 8a. The remaining region of the auxiliary belt layer other than the above regions, i.e. a region corresponding to each of the circumferential grooves 4 of the tread 3 and the central portion of the tread in the illustrated embodiment has one-layer structure being a repetitive side by side arrangement of the above slant windings 8b.

The width of the ribbon 10 is preferably within a range of 3-15 mm. When the width is less than 3 mm, the winding number increases to degrade the operation efficiency, while when it exceeds 15 mm, the shifting quantity of the ribbon per one winding in the widthwise direction of the tread becomes large and hence it is difficult to change the winding manner of the ribbon while meeting side edges of adjoining ribbons at the boundary between the above regions.

In the pneumatic radial tire according to the invention, the tread may have many lateral grooves (not shown) connecting the circumferential grooves 4 with each other and connecting the circumferential groove 4 to the tread end T in addition to the above circumferential grooves 4 and the auxiliary circumferential groove 5. For example, 5 rows in total of island portions 6 (longitudinal block group) are defined by the circumferential grooves lateral grooves and tread end T.

The number of the circumferential grooves 4 is 4 in total in the illustrated embodiment, but it is preferably 4-8 in total. Moreover, it is favorable that the lateral groove extends at an acute angle with respect to the circumferential groove 4 toward a direction focusing to the equator of the tire from a viewpoint of the drainage property, in which the width and depth are equal to or less than those of the circumferential groove.

When the region of the auxiliary belt layer corresponding to the island portion at least adjacent to the tread end, is comprised of the partly overlapped alternating arrangement of the parallel windings and the slant windings and the region of the auxiliary belt layer corresponding to at least one circumferential groove is comprised of only the side by side windings slant, the upper layer and the lower layer in such an auxiliary belt layer structure can be formed by continuously winding the ribbon without cutting, and not only the starting end but also the terminal end of the ribbon can be arranged outside the ground contacting portion of the tread, so that the hoop effect of the auxiliary belt layer can be further increased.

Moreover, when the auxiliary belt layer is constructed by winding the ribbon at a certain uniform overlapped amount over the full width of the tread according to the conventional technique, the required skid rubber gauge can not be obtained as previously mentioned. On the other hand, according to the invention, the region of the auxiliary belt layer located beneath the circumferential groove is comprised only of the slant layers arranged side by side, so that the hoop effect at the island portion can be enhanced without extremely thinning the skid rubber gauge at a position located beneath the circumferential groove and hence the high-speed durability can be improved. When the number of the auxiliary belt layers is reduced at the region located beneath the circumferential groove as compared with the region located beneath the island portion, the ribbon can be arranged in parallel to the circumferential groove and at a region substantially equal to the width of the circumferential groove. On the contrary, when the auxiliary belt layer is merely formed by helically winding only the ribbon for the formation of the slant winding in the usual manner, even if the ribbon is arranged side by side at the region located beneath the circumferential groove without overlapping, the adjoining overlapped portion encroaches into the region located beneath the circumferential groove or the non-overlapped portion encroaches into the region located beneath the island portion, and consequently the skid rubber gauge beneath the circumferential groove becomes too thin to cause the cracking at the groove bottom or the desired hoop effect at the island portion can not be attained. According to the invention, therefore, tires having improved high-speed durability and uniformity can be manufactured.

In the illustrated embodiment, the auxiliary belt layer is a combination of two layers and one layer in widthwise direction, but a combination of two layers and three layers or other combination may be used. In the latter case, the lower layer(s) other than the combination of the outermost two or one layer is first formed and thereafter the above combination is formed thereon. When the number of the lower layers to be formed is even number, they may be the overlapped alternating arrangement of parallel winding and slant winding as defined in the invention, or the ribbon may be wound on the previously wound portion as in the conventional technique.

The following example is given in illustration of the invention and is intended as limitation thereof.

A pneumatic radial test tire having a tire size of 245/40 ZR17 was prepared according to the structure shown in FIG. 1a.

In this test tire, the circumferential groove had a width of 10 mm and a depth of 8 mm, and the auxiliary circumferential groove had a width of 5 mm and a depth of 6 mm. The lateral groove had a width of 5 mm and a depth of 7 mm and was focused toward the equator of the tire at an angle of 80° with respect to the equator. Furthermore, the angle between the lateral groove and the circumferential groove near to the tread end was 60°, and the angle between the lateral groove and the circumferential groove in the central portion of the tread was 70°.

The two main belt layers each containing steel cords of 1×5 structure arranged at an inclination angle of 20° with respect to the equator, cords of which layers being crossed with each other, were arranged outside the carcass and further the auxiliary belt layer was arranged to cover the main belt layer over a full width thereof.

The auxiliary belt layer was formed by winding of a ribbon composed of a rubberized five nylon cords (1260d/2) with a width of 5 mm. In this case, as shown in FIG. 1b, the ribbon was first wound in parallel with the equator of the tire and then wound thereon from an overlapped starting point at an angle of inclination of $\theta$ of 0.157° where $$\tan \theta = \frac{5}{1820}$$

or at a cross feeding rate of 5 mm to form a two-layer structure in the region of the auxiliary belt layer corresponding to each of two rows of island portions near to the tread end, while each of the other remaining regions was one-layer structure formed by helically and continuously winding the ribbon likewise the above second winding. Moreover, the ribbon was continuously wound in series from the starting point at one of the tread ends toward the terminal end at the other tread end.

Similarly, a comparative tire was prepared according to the structure shown in FIG. 1a likewise the test tire except that the first layer and second layer in the auxiliary belt layer were separately and helically wound in the conventional manner.

These tires were subjected to a drum test for high-speed durability and a uniformity test to obtain results as shown in the following Table 1.

TABLE 1

|  | Test tire | Comparative tire |
|---|---|---|
| High-speed durability | 103~110 | 100 |
| Uniformity | 110~115 | 100 |

Moreover, these test results were evaluated by an index on the basis that the result of the comparative tire was 100. (The larger the index value, the better the property).

In the drum test for high-speed durability, the tire was mounted onto a rim of 8×17 inch under an internal pressure of 2.55 kgf/cm² and trained on a drum at a speed of 100 km/h under a load of 400 kg for 10 minutes, and thereafter the speed was raised at a rate of 10 km/h every 10 minutes until the tire was broken.

In the uniformity test, the uniformity of the tire mounted on a rim having width of 17 inch was measured on a uniformity machine of 33 inch under an internal pressure of 2.0 kgf/cm² and a load of 320 kg.

As seen, according to the invention, tires suitable for high-speed running cars having improved high-speed durability and uniformity can be provided by increasing the hoop effect through the auxiliary belt layer. Also, the tire building operation can be simplified because the formation of the auxiliary belt layer can be carried out by the continuous and helical winding of single ribbon.

What is claimed is:

1. A pneumatic radial tire comprising; a radial carcass composed of at least one carcass ply extending through a cylindrical crown portion between a pair of sidewall portions extended inward form both ends of the crown portion in a radial direction, a belt and a tread successively arranged on the carcass outward from the crown portion in radial direction;

said tread having a plurality of grooves extending circumferentially of the tire and a plurality of island portions defined between said circumferential grooves and both side ends of the tread;

said belt comprising at least two main belt layers containing substantially inextensible cords arranged at a small inclination angle with respect to an equatorial plane of the tire, cords of said belt layers being crossed with each other, and an auxiliary belt layer formed by winding a ribbon-shaped ply, said ply obtained by arranging plural heat-shrinkable cords side by side and coating them with rubber, said auxiliary layer positioned radially outside the main belt layer over its full width;

said auxiliary belt layer having a structure wherein a regions substantially corresponding to said island portions adjacent to the tread ends each have a partially overlapped alternating arrangement of a parallel winding in which the heat-shrinkable cords in the ribbon-shaped ply extend on the same circumference in parallel to the equatorial plane and a slant winding in which the heat-shrinkable cords of the ribbon-shaped play extend substantially at an angle of inclination $\theta$ where tan $\theta$ = width of the ribbon-shaped ply/outer peripheral length of the main belt layers, while a region substantially corresponding to at least one circumferential groove in the tread has a repetitive side by side arrangement only of slant windings; and said ribbon-shaped ply being continuous at least in each of the above regions.

2. The pneumatic radial tire according to claim 1, wherein said ribbon-shaped ply has a width of 3-15 mm.

3. The pneumatic radial tire according to claim 1, wherein the number of said circumferential grooves is 4-8 in total.

4. The pneumatic radial tire according to claim 1, wherein said auxiliary belt layer ribbon-shaped ply contains heat-shrinkable nylon cords arranged side by side.

5. The pneumatic radial tire according to claim 1, wherein said auxiliary belt layer extends with said partially overlapped alternating arrangement under island portions laterally inside those islands adjacent to said tread ends.

6. The pneumatic radial tire according to claim 1, wherein said belt comprises a pair of layers whose cords are arranged at cord angles of 15°-35° with respect to said equatorial plane.

* * * * *